United States Patent [19]

Meeusen

[11] 3,727,776
[45] Apr. 17, 1973

[54] AN INTEGRATED SYSTEM FOR LOADING AND UNLOADING CONTAINERS IN OR FROM CONTAINER SHIPS

[75] Inventor: Pieter Meeusen, Barendrecht, Netherlands

[73] Assignee: H. Nielsen & Son Maskinfabrik A/S, Herlev, Netherlands

[22] Filed: Jan. 18, 1971

[21] Appl. No.: 107,400

[30] Foreign Application Priority Data

Jan. 21, 1970 Netherlands ....................... 7000818

[52] U.S. Cl. ............................... 214/14, 214/38 CA
[51] Int. Cl. .............................................. B65g 63/00
[58] Field of Search ................... 214/14, 15 R, 38 CA, 214/152

[56] References Cited

UNITED STATES PATENTS

| | | |
|---|---|---|
| 2,894,650 | 7/1959 | Black et al. ......................... 214/14 X |
| 1,404,947 | 1/1922 | Ritch ................................. 214/38 CA |
| 1,632,253 | 6/1927 | Triay, Jr. et al. ....................... 214/14 |
| 2,715,969 | 8/1955 | Olsen................................. 214/14 X |
| 3,091,188 | 5/1963 | Graham ....................... 214/38 CA X |
| 3,591,023 | 7/1971 | Allen..................................... 214/14 |

FOREIGN PATENTS OR APPLICATIONS

| | | | |
|---|---|---|---|
| 953,530 | 3/1964 | Great Britain................ | 214/15 R |

*Primary Examiner*—Gerald M. Forlenza
*Assistant Examiner*—Frank E. Werner
*Attorney*—Cushman, Darby & Cushman

[57] ABSTRACT

A method of and means for loading and unloading containers in or from container ships in connection with the so called containerization, the transfer of each provided with endless conveyors, conveyors at the terminal being on platforms and conveyors in the ship being provided in lanes between the platforms and elevators in the ship, the said conveyors being in alignment to permit streaming of containers from the platforms to the elevators or vice versa. The platforms may be adjustable vertically to come to the level of said conveyors in the ship or to line up with ramps which have conveyors and fold down to provide an opening in the ship-s bow or stern and convey the conveyors in the streams from the platforms to the conveyors in the said lanes of the ship. Upper and lower platforms may be provided and go and return lanes provided in the ship so that conveyance of containers to the elevators in the ship as streams in one general direction can take place from platforms at one level while the conveyance of containers from the elevator to platforms at a different level at the terminal takes place in the reverse direction. Conveyance from the elevators is to longitudinal holds in the ship which have conveyors which line up with those on the elevators.

Except for gantry cranes at the terminal and in a marshalling area, cranes can be obviated and relatively fast streaming of containers is permitted.

3 Claims, 4 Drawing Figures

AN INTEGRATED SYSTEM FOR LOADING AND UNLOADING CONTAINERS IN OR FROM CONTAINER SHIPS

This invention relates to a method of and means for loading and unloading containers in or from container ships, in connection with the so-called containerization, i.e., for loading containers into a container ship from a shore-based terminal and unloading from the ship onto the terminal, which terminal may be related to a marshalling area in which the containers are systematically stored.

Containers are in some cases carried by a trailer chassis connectable to a motor driven driver vehicle (trucker) to be driven onto or off the ship. For short sea routes the truckers may be driven and stay on board and for longer routes the truckers may return to shore, leaving the chassis and the container on board. This latter method avoids the transit at sea of the truckers themselves but the connection and disconnection of the truckers involves considerable loss in loading and unloading time. In either case uneconomical use of the ship's storage space is involved.

For the larger container ships, the containers are usually deposited by cranes in so-called vertical cells of the ship. The vertical cells have to be deeper with increase in size and width of the ship, and the distance of transportation of each container by the crane is increased, i.e., the larger the ship the longer is each crane cycle, entailing much loss of time in transferring a large number of containers to the dock from the ship.

The present invention aims at a method and means whereby the process of loading and unloading can be greatly speeded-up especially when large container ships are involved.

According to the invention, the transference of containers from a container ship to a shore-based terminal and vice versa is carried out by an integrated system in which the ship and terminal are each provided with endless conveying means, the said means on the terminal and those on the ship co-operating to permit a flow or stream of containers from the terminal to the ship and vice versa.

The conveying means of the terminal may be vertically adjustable so that they may be brought to the level of the conveying means on the ship to be aligned or linked therewith.

The ship may be provided with longitudinally extending holds for the containers, these holds being equipped with endless conveyors, and conveyors are provided to convey the containers to or from the holds through an opening in the ship's hull, e.g., in the stern or bow of the ship above the water line. The containers may enter the opening from, or exit through the opening to, the conveyors of the terminal. The holds may extend longitudinally in abreast arrangement across the width of the ship and at different levels and be associated with elevators which are also provided with endless conveyors so that containers may be conveyed to the elevators from the terminal and transferred from the elevators to the conveyors of a hold at a selected level or vice versa.

The conveying means of the terminal may be carried by platforms at different levels and of different lengths and the conveying means of the ship may be such that containers may be loaded on the conveyors on one platform and transferred to conveying means on the ship for distribution in the ship by way of the elevators and simultaneously containers may be transferred from the ship to the conveyors on the other platform for distribution in a marshalling area.

Gantry cranes may be associated with the platforms and displaceable transversely of the conveyors on the platforms (a) to transfer containers from conveying means on the marshalling area to the conveyors of one platform for conveyance into the ship and (b) simultaneously to transfer containers unloaded from the ship onto the conveyors of the other or another platform for transfer again to conveying means for distribution in the marshalling area. For example, containers may be transferred from the ship to a lower platform, and after a period of time, loading onto an upper platform into the ship may be commenced while unloading by way of the lower platform continues. While the reverse is possible, it is advantageous to unload via a lower platform which is longer than the upper platform since the longer platform can support a larger number of containers and promote speedier emptying of the holds for re-loading.

The conveyor means on the marshalling area may be operated to register a container with any one of a plurality of lanes at an angle, e.g., a right angle, thereto, each said lane being associated with at least one gantry crane which is displaceable along the lane so that a container can be transferred from the said conveyor means to a selected position in the selected lane and subsequently from that position onto a vehicle on a rail track or road or placed in position for conveyance to a ship.

The invention provides an improved container ship suitable for the system described, comprising (a) longitudinally extending container holds in abreast order across the width of the ship and at different levels in the ship, the holds being provided with endless conveyors, and comprising (b) elevator means provided with endless conveyors adapted to operate in synchronism with the conveyors of the holds for transferring containers to or receiving containers from the conveyors of the holds; and longitudinally extending endless conveyor means for conveying containers between the elevators and an opening suitably located and closable in the stern, bow or a side of the ship, through which containers can be loaded into or unloaded from the ship.

The opening may be above the water line of the ship and be closed by members comprising conveyor sections which can be hinged down to operative position and may form a ramp to co-operate between the conveying means on the ship and the conveyors of the terminal.

The invention also provides an improved terminal for storing containers unloaded from, or to be loaded into, a ship, having two or more loading platforms one above another, each platform being provided with endless conveyors, the conveyors on one platform being operable in the reverse direction to the conveyors on the other or another platform and the platforms being so constructed and arranged, e.g., one longer than the other or another, that, by means of overhead cranes, containers may be loaded on the conveyors of one platform for transfer to the ship and unloaded from the conveyors of the other or another platform for distribution in the marshalling area.

The said overhead cranes may be arranged for guided travel to and fro in a direction transverse to the direction of conveyance by the conveyors on the platform.

By the system, containers, to enter a layered series of holds in the ship, may flow from the terminal into the ship along a substantially horizontal path to elevators in the ship and straight on into an appropriate longitudinal hold or lowered for entry into a longitudinal hold at a lower level. Containers may simultaneously be flowed from the ship by a reverse sequence of operations and lowering into or lifting from the ship of containers by crane action can be dispensed with and the process of loading and unloading very greatly accelerated. Vertical movement of the containers in transferring any one of them from a hold in the ship to a platform on the terminal is thus restricted to the movement effected by the elevators in the ship and relatively small displacement by means of cranes is sufficient to transfer the containers from the relevant platform of the terminal to the ground level of the marshalling area or from that level to a platform for loading. Thus the total route of transportation can be shortened considerably and a substantial number of endless conveyors may be in simultaneous operation for rapid loading and unloading to promote a short port turnround.

It is usual for container ships to be completely unloaded before the loading can be commenced. Therefore the space for the container storage in the marshalling area has to be of sufficient size to store the containers that have to be loaded as well as those which have to be unloaded. Consequently the larger ships call for an unduly large marshalling area. The transporting distances are greater than is desirable and the direct and indirect cost of transportation are higher. Both such cost and the loading and unloading time can be reduced considerably by the invention.

A system according to the invention is illustrated by way of example in the accompanying drawings, in which FIG. 1 is a longitudinal sectional elevation of the integrated system;

Figure 1:
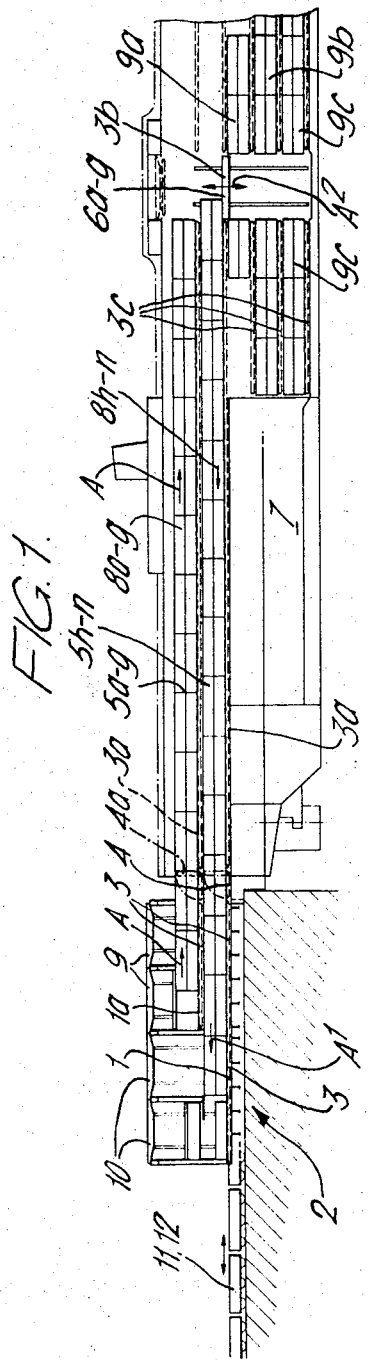
Figure 2:
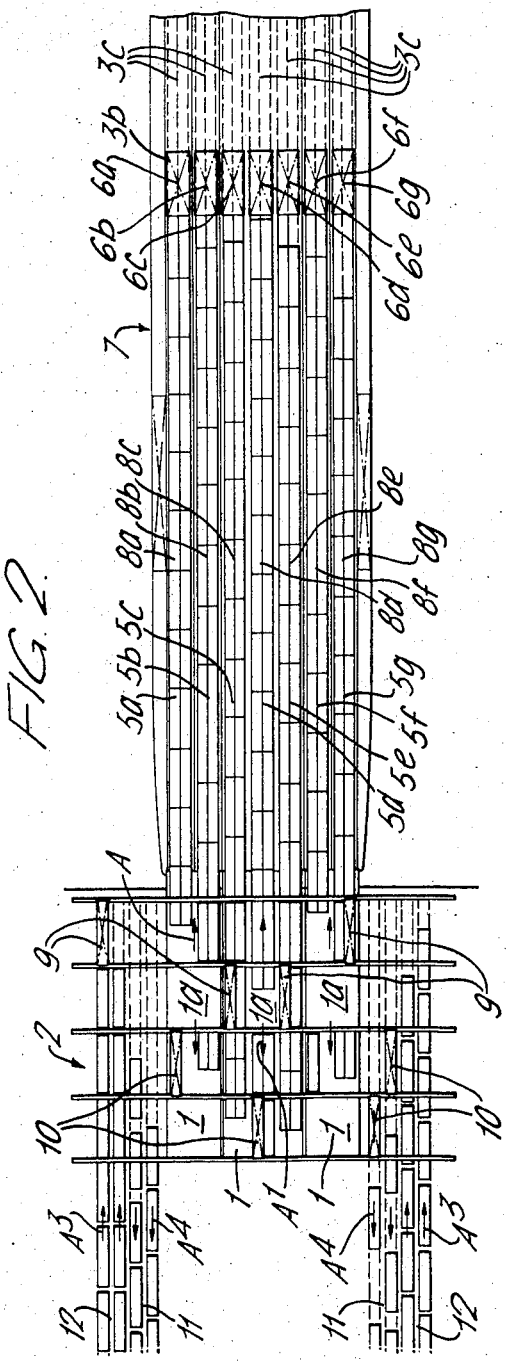
FIG. 2 is a plan view thereof.

As shown in FIGS. 1 and 2, the terminal 2 is provided with loading and unloading platforms 1 and 1a, each platform being provided with endless conveyors 3 which are aligned or linked with sections 4, 4a of endless conveyors 3a which extend along longitudinal lanes 5a, 5b, 5c, 5d, 5e, 5f, 5g in the ship 7 up to the platforms of elevators 6a, 6b, 6c, 6d, 6e, 6f, 6g arranged across the width of the ship. The sections 4, 4a, may be hinged to an out-of-use position and may when lowered serve as ramps. They may be located above the ship's water line and may be adapted to seal the opening in the ship through which the containers pass. Streams of containers 8a, 8b, 8c, 8d, 8e, 8f and 8g can thus be fed by the conveyors on platforms 1a and conveyors 3a to the elevators and either pass on or be lowered by the elevators into longitudinal holds 9a, 9b and 9c one above another, each such hold forming one of a layer extending across the width of the ship. The elevators may be located as shown, so that containers may be fed in opposite directions therefrom into the holds 9a, 9b and 9c. Each elevator is provided with one or more endless conveyors 3b to link up with the conveyors 3a aforesaid or with conveyors 3c in the holds 9a etc.

The arrows A indicate the direction in which the containers are fed as streams from the platform 1a through the lanes 5a to 5g to the elevators, each stream being shown as comprising two sets of containers one above the other. By way of the elevators 6a etc., the containers of each stream can be lowered and then pass from the conveyors on the elevators into a selected one of the lower longitudinal holds 9a, 9b, 9c, being conveyed from the conveyor on the elevator to the conveyor of the selected hold.

The arrows $A^1$ indicate streams flowing in the reverse direction. The double headed arrows $A^2$ indicate that containers at the elevator stage may ascend or descend according to whether a hold is to be loaded or unloaded.

As can be seen in FIG. 2, the lower platform 1 is longer (in the direction of conveyance) than the upper platform 1a. At the terminal a number (four being shown) of gantry cranes 9, which can be traversed transversely with respect to the direction of conveyance are provided for co-operation with the platform 1a and a number (again four are shown) of gantry cranes 10 similarly arranged for transverse traverse are provided for co-operation with the lower platform 1.

By means of the overhead cranes 9 containers can be transferred from conveyors 12 (which may be composed of a series of end-to-end endless conveyors) arranged along the marshalling area, and travelling in a direction $A^3$, onto the platform 1a to form streams 8a – 8g. The conveyors 12 may convey the containers in single order and the containers may be stacked two-high on the platform 1a. Simultaneously by means of the cranes 10 streams of conveyors 8h – 8n coming from the conveyors in the ship holds and terminating on the conveyors of platform 1 can be unloaded onto the conveyors 11 and conveyed in the direction $A^4$ along the marshalling area. Thus opposite streams may be produced in loading and unloading the ship. In the embodiment shown two-high streams are produced. The cranes may take the containers off the platform 1 singly and deposit them on separate conveyors 11.

Figure 3:
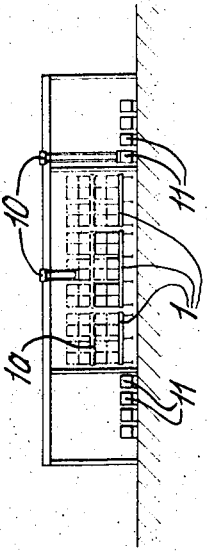
FIG. 3 is an end view of the terminal region which co-operates with the ship.

In FIG. 3 is shown in full lines the sectional form of the platform 1 and in dotted lines the sectional form of the platform 1a.

Figure 4:
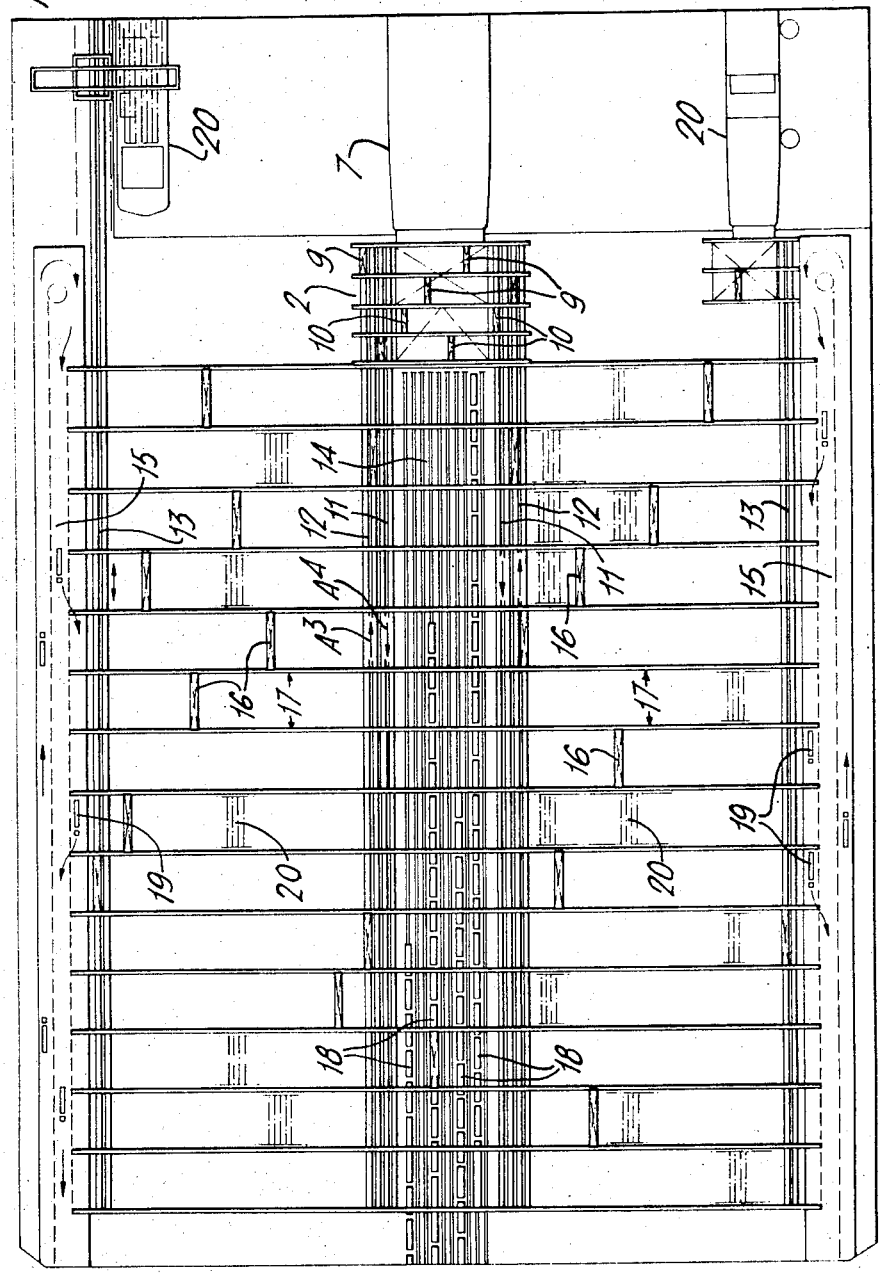
FIG. 4 is a plan view of the system in relation to a shore marshalling area.

FIG. 4 shows a pair of parallel conveyors 11 (each conveyor may be of sectional form as described) and a pair of conveyors 12 (again the conveyors may be of the sectional form described). Between the conveyors 11, 12 on one side and those on the other, rail tracks 14 are indicated, while 15 indicate roads running parallel to the rail tracks. The marshalling area is divided e.g., by rails into multiple transverse lanes 17 each equipped with a gantry crane 18 which can be displaced along its lane. The crane can thus transport the containers between a conveyor 11 or 12 and the rail track 14 or one of the roads 15. The containers may be deposited by the cranes on rail vehicles 18 or on road vehicles 19. One or more further conveyors 13 (which may be composed of an aligned series of endless conveyors) serve for transporting containers to or from a vessel or vessels 20, e.g., for passage to or from an inland waterway. The containers may be stacked, e.g., four or more high, on top of one another in the transverse lanes in the marshalling area.

Suitable stop-start means for stacking on the platform 1a and for stopping flow when the appertaining elevator is ascending or descending may be provided under a central control.

Other ways of distributing the containers in the marshalling area are possible. The containers may for example be fed to or from the ship and the lanes of the marshalling area by way of conveyors, such as a perimetral system of conveyors in the marshalling area, or such a system and connecting conveyors, in such a way that the containers need to change the direction of flow, in which case turntables or sliding platforms equipped with matching endless conveyors may be provided for linking conveyors.

What is claimed is:

1. An integrated system for transferring containers into a container ship from a terminal and from the container ship to the terminal, having:
    a. a terminal comprising a plurality of platforms having first conveying means for conveying containers in a given direction;
    b. a container ship comprising a plurality of container-transporting lanes having second conveying means which align with those on the platforms for further conveyance of the containers;
    c. elevators associated with said lanes of said container ship and having third conveying means which align with the second conveying means in said lanes so that containers may be fed as a continuous stream from a platform through any of the said lanes to an elevator;
    d. holds extending longitudinally at different levels and in abreast order across the ship and having fourth conveying means which align with those on the elevators; and
    e. ramps on the ship and conveying means on said ramps, openings in the ship covered by said ramps, said ramps being foldable to align the conveyors thereon with the conveying means on the platforms and the conveying means in the said lanes.

2. An integrated system for transferring containers into a container ship from a terminal and from the container ship to the terminal, having:
    a. a terminal comprising a plurality of platforms having first conveying means for conveying containers in a given direction;
    b. a container ship comprising a plurality of container-transporting lanes having second conveying means which align with those on the platforms for further conveyance of the containers;
    c. elevators associated with said lanes of said container ship and having third conveying means which align with the second conveying means in said lanes so that containers may be fed as a continuous stream from a platform through any of the said lanes to an elevator;
    d. holds extending longitudinally at different levels and in abreast order across the ship and having fourth conveying means which align with those on the elevators; and wherein
    e. the platforms are at different levels and the cooperating conveying means in said lanes are such that containers may be loaded on the conveying means on one platform and transferred to conveying means in a lane for transfer to an elevator and simultaneously containers may be transferred from another elevator by way of another lane means on to another platform at a different level for distribution in a marshalling area.

3. The system according to claim 2, in which gantry cranes are associated with the platforms and are operative
    a. to transfer containers from conveying means in the marshalling area to the conveying means of one platform for conveyance into a lane in the ship, and
    b. simultaneously to transfer containers unloaded from the ship from another platform at a different level to conveying means of the marshalling area for distribution therein.

* * * * *